(12) United States Patent
Hirose

(10) Patent No.: US 10,249,337 B2
(45) Date of Patent: Apr. 2, 2019

(54) MAGAZINE MANAGEMENT DEVICE, DISC DEVICE, AND MAGAZINE MANAGEMENT SYSTEM

(71) Applicant: Panasonic Intellectual Property Management Co., Ltd., Osaka (JP)

(72) Inventor: Ryoji Hirose, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/464,875

(22) Filed: Mar. 21, 2017

(65) Prior Publication Data
US 2017/0194028 A1 Jul. 6, 2017

Related U.S. Application Data

(63) Continuation of application No. PCT/JP2015/005069, filed on Oct. 6, 2015.

(30) Foreign Application Priority Data

Oct. 8, 2014 (JP) ................ 2014-207018

(51) Int. Cl.
*G11B 17/22* (2006.01)
*G11B 23/023* (2006.01)
(Continued)

(52) U.S. Cl.
CPC .......... *G11B 17/228* (2013.01); *G11B 17/049* (2013.01); *G11B 17/225* (2013.01);
(Continued)

(58) Field of Classification Search
CPC . G11B 17/228; G11B 17/225; G11B 23/0305; G11B 17/049; G11B 23/023; G11B 23/30
See application file for complete search history.

(56) References Cited

U.S. PATENT DOCUMENTS 5,255,251 A * 10/1993 Fitzgerald ............ G11B 17/225
360/98.06
6,100,804 A * 8/2000 Brady .............. G06K 19/07749
257/678
(Continued)

FOREIGN PATENT DOCUMENTS

CN 101140785 A 3/2008
JP 2003-518311 6/2003
(Continued)

OTHER PUBLICATIONS

International Search Report of PCT application No. PCT/JP2015/005069 dated Dec. 28, 2015.
(Continued)

*Primary Examiner* — Brian E Miller
(74) *Attorney, Agent, or Firm* — Renner, Otto, Boisselle & Sklar, LLP

(57) ABSTRACT

A magazine management device stores a plurality of magazines in which a plurality of optical discs is housed. The magazine management device includes a case that supports the plurality of magazines, a plurality of partitions that divides the case so as to form a plurality of regions in which the magazines can be stored one by one, an antenna that transmits a radio wave for asking a radio identifier provided to the magazine for a response and receives a radio wave of the response transmitted from the radio identifier, and an arithmetic processor that receives information obtained from the radio wave of the response received by the antenna.

3 Claims, 11 Drawing Sheets

(51) Int. Cl.
*G11B 23/30* (2006.01)
*G11B 17/049* (2006.01)
*G11B 23/03* (2006.01)

(52) U.S. Cl.
CPC ........ *G11B 23/023* (2013.01); *G11B 23/0305* (2013.01); *G11B 23/30* (2013.01)

(56) References Cited

U.S. PATENT DOCUMENTS

| | | | | |
|---|---|---|---|---|
| 6,370,444 | B1* | 4/2002 | Kusunoki | G11B 17/225 700/214 |
| 7,681,048 | B2* | 3/2010 | Starr | G06F 21/6218 711/100 |
| 8,081,331 | B2* | 12/2011 | Sekiya | H04N 1/00193 358/1.15 |
| 8,344,887 | B2* | 1/2013 | Czapla | G07F 5/00 340/539.1 |
| 9,141,821 | B2* | 9/2015 | Goodman | G06F 21/6218 |
| 2005/0057847 | A1* | 3/2005 | Armagost | G11B 15/6835 360/92.1 |
| 2005/0162772 | A1* | 7/2005 | Masuda | G11B 15/6835 360/69 |
| 2006/0064542 | A1* | 3/2006 | Goodman | G06F 3/0607 711/114 |
| 2007/0030494 | A1* | 2/2007 | Kusumi | G03G 15/0863 358/1.3 |
| 2007/0127323 | A1* | 6/2007 | Owens | G11B 17/225 369/30.38 |
| 2007/0260891 | A1* | 11/2007 | Starr | G06F 21/6218 713/193 |
| 2008/0178206 | A1* | 7/2008 | Iida | G11B 17/22 720/648 |
| 2009/0237834 | A1* | 9/2009 | Goodman | G11B 15/6835 360/92.1 |
| 2011/0175709 | A1 | 7/2011 | Suzuki | |
| 2012/0079510 | A1 | 3/2012 | Yoshida et al. | |
| 2013/0097039 | A1* | 4/2013 | Czapla | G07G 1/14 705/21 |
| 2013/0125149 | A1* | 5/2013 | Shimomura | G11B 33/1446 720/601 |
| 2015/0055444 | A1* | 2/2015 | Bacom | G11B 15/6835 369/75.11 |
| 2016/0155463 | A1* | 6/2016 | Takahashi | G11B 27/10 720/652 |
| 2016/0350005 | A1* | 12/2016 | Yuba | G06F 3/0605 |
| 2017/0098462 | A1* | 4/2017 | Barajas Gonzalez | G06K 19/07777 |

FOREIGN PATENT DOCUMENTS

| | | |
|---|---|---|
| JP | 2005-195341 | 7/2005 |
| JP | 2005-320074 | 11/2005 |
| JP | 2007-036372 | 2/2007 |
| JP | 2007-335033 | 12/2007 |
| JP | 2010-020875 | 1/2010 |
| JP | 2011-146007 | 7/2011 |
| JP | 2012-074104 | 4/2012 |
| JP | 2013-206511 | 10/2013 |
| WO | 2001/006506 | 1/2001 |

OTHER PUBLICATIONS

English Translation of Chinese Search Report dated Sep. 19, 2018 for the related Chinese Patent Application No. 201580050612.4.

* cited by examiner

MAGAZINE MANAGEMENT DEVICE, DISC DEVICE, AND MAGAZINE MANAGEMENT SYSTEM

BACKGROUND

1. Technical Field

The present disclosure relates to a magazine management device that manages a magazine in which a plurality of optical discs is housed, and a disc device that records data in optical discs in each magazine and reads data from the optical discs.

2. Description of the Related Art

In a device that records a lot of data, a plurality (for example, 12) of optical discs is housed in one magazine, and optical discs in each magazine are managed in some cases. As a result, optical discs in which data is recorded can be managed more efficiently than a case where single optical disc is managed.

Unexamined Japanese Patent Publication No. 2012-074104 (patent literature 1) discloses a magazine in which a plurality of optical discs is housed, and a disc changer that takes out an optical disc from the magazine so as to perform recording and reproducing.

However, when a data amount and a number of magazines increase, the management of the magazines becomes difficult.

SUMMARY

A magazine management device of the present disclosure is a magazine management device that stores a plurality of magazines in which a plurality of optical discs is housed. The magazine management device includes a case that supports the plurality of magazines, a plurality of partitions that divides the case so as to form a plurality of regions in which the magazines can be stored one by one, an antenna that transmits a radio wave for asking a radio identifier provided to the magazine for a response and receives a radio wave of the response transmitted from the radio identifier, and an arithmetic processor that receives information obtained from the radio wave of the response received by the antenna.

A disc device of the present disclosure is a disc device that detachably stores a magazine that has a radio identifier in which information including identification information of the magazine is recorded. A plurality of optical discs is housed in the magazine. This disc device includes a picker that takes out the plurality of optical discs from the magazine, and a disc drive that writes or reads data in or from one optical disc of the plurality of optical discs taken out by the picker. When taking out the plurality of optical discs from the magazine, the picker reads the information from the radio identifier provided to the magazine.

A magazine management system of the present disclosure includes the aforementioned magazine management device and the aforementioned disc device.

DETAILED DESCRIPTION

Figure 1:
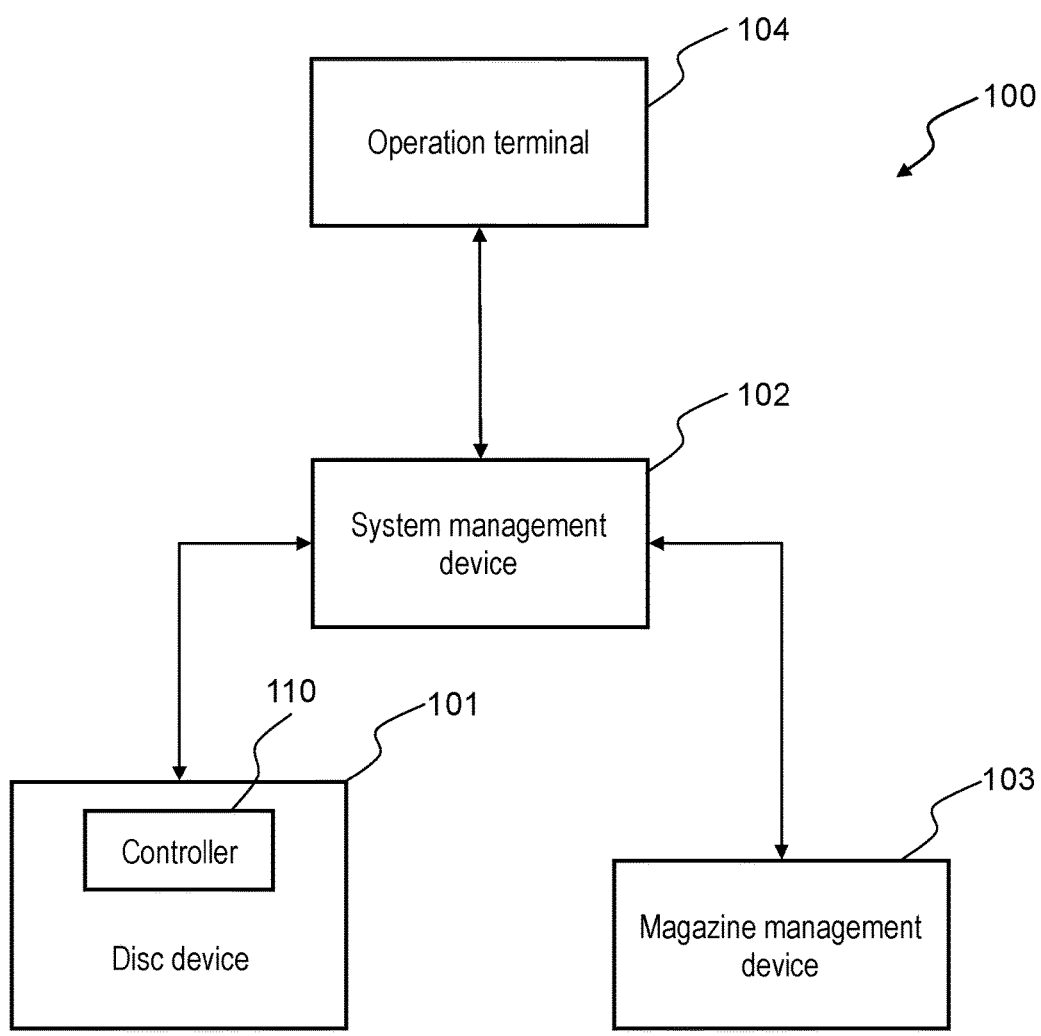
FIG. 1 is a diagram schematically illustrating one configuration example of a magazine management system according to a first exemplary embodiment.

Exemplary embodiments will be described in detail below suitably with reference to the drawings. Description that is more detailed than necessary will be occasionally omitted. For example, detailed description about already well-known matters and overlapped description about a substantially same configuration will be occasionally omitted. This is in order to prevent the description below from being unnecessarily redundant so that a person skilled in the art can easily understand the present disclosure.

It is to be noted that the accompanying drawings and the following description are provided in order for a person skilled in the art to fully understand the present disclosure, and are not intended to limit the subject described in the appended claims.

Also, identical reference numerals, symbols, and numbers in the description shall represent same components unless otherwise described. Further, components that are not essential in the present disclosure are not illustrated unless otherwise described.

First Exemplary Embodiment

A first exemplary embodiment will be described below with reference to FIGS. 1 to 9.

[1-1. Configuration]

FIG. 1 is a diagram schematically illustrating one configuration of magazine management system 100 according to a first exemplary embodiment.

Magazine management system 100 includes disc device 101, system management device 102, magazine management device 103, and operation terminal 104. In magazine management system 100, disc device 101, system management device 102, magazine management device 103, and operation terminal 104 are connected to each other by a network.

Disc device 101 has a radio identifier in which information including identification information of a magazine is recorded, and detachably stores a magazine in which a plurality of optical discs is stored. Disc device 101 has controller 110, and performs processing such as writing data in an optical disc as a recording medium or reading data from the optical disc, based on an instruction from system management device 102. Disc device 101 does not handle a single optical disc but treats a magazine in which a plurality of optical discs is housed. When an optical disc is taken out of disc device 101, a magazine in which the optical disc is housed is taken out, and when an optical disc is inserted into disc device 101, a magazine in which the optical disc is housed is inserted.

A number of disc device 101 provided to magazine management system 100 may be one, or a plurality of disc devices 101 may be provided.

System management device 102 specifies a magazine in which an optical disc for writing or reading and instructs disc device 101 to write or read data according to an instruction from a user who operates operation terminal 104. In order to perform such an operation, system management device 102 obtains information necessary for managing magazines such as information for identifying the magazine (hereinafter, "identification information") and information for managing each magazine (hereinafter, "management information") from disc device 101 and magazine management device 103 so as to save the information. As a result, system management device 102 can select a suitable magazine according to the user's instruction. Also when data writing or data reading is requested from another computer system or the like (not shown), system management device 102 identifies a suitable magazine according to the request, specifies the magazine, and instructs disc device 101 to write or read data.

Further, when magazine management system 100 has a plurality of disc devices 101, system management device 102 suitably selects disc device 101 which should be instructed to write or read data, and suitably controls disc device 101 according to the request.

As described above, system management device 102 obtains the information for suitably managing magazines, such as magazine identification information and magazine management information from disc device 101 and magazine management device 103 so as to save the information. For example, system management device 102 obtains, from magazine management device 103, information regarding a magazine in which an optical disc where data is written by disc device 101 is housed so as to manage the information. Concretely, when magazine management device 103 stores a magazine in which an optical disc where data is written by disc device 101 is housed, system management device 102 obtains, from magazine management device 103, information representing a place in magazine management device 103 where the magazine is stored, and the identification information regarding the magazine. Further, system management device 102 obtains, from disc device 101, information representing, for example, what type of data (for example, a file name or a file extension) is saved in which optical disc in which magazine, and when the data is written or updated so as to save the information.

Magazine management device 103 stores the magazine in which the optical disc where the data is written by disc device 101 is housed, and reads the identification information of the magazine and the other information for managing the magazine from each magazine so as to transmit the information to the system management device 102. Details of magazine management device 103 will be described later.

Operation terminal 104 has a user interface (UI) that accepts user's operations, and gives an instruction to system management device 102, based on a user's operation. Operation terminal 104 may have a function for monitoring a situation of magazine management system 100.

Disc device 101 will be described below.

Figure 2:
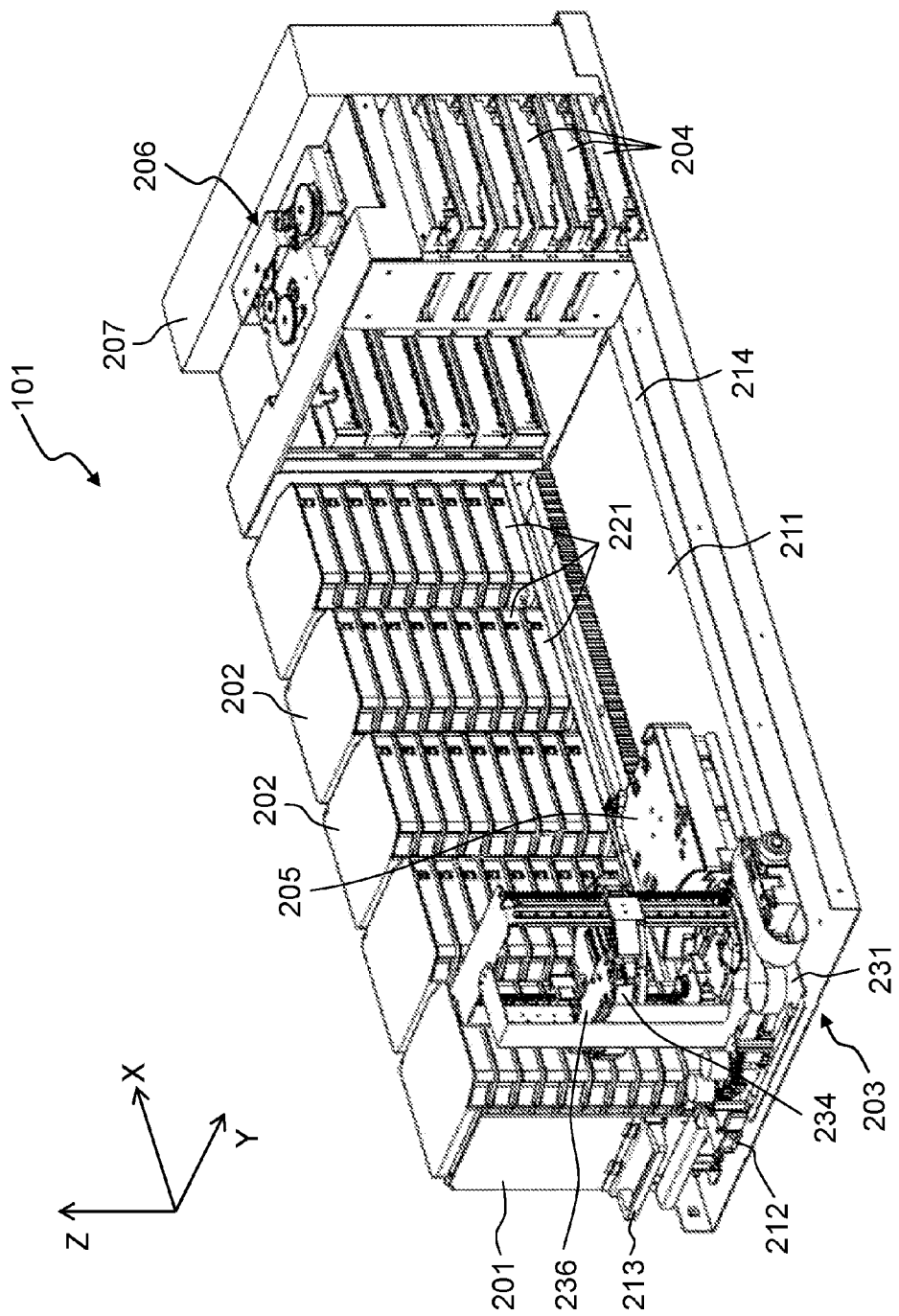
FIG. 2 is a perspective view schematically illustrating one configuration example of a disc device according to the first exemplary embodiment.

FIG. 2 is a perspective view schematically illustrating one configuration example of disc device 101 according to the first exemplary embodiment. For convenience, hereinafter, three axes X, Y, and Z are used in the following description.

Disc device 101 includes magazine stocker 201, bottom chassis 211, a plurality of magazines 202, picker 203, a plurality of disc drives 204, carrier 206, main circuit part 207, guide rail 212, and rack 214.

Disc device 101 according to this exemplary embodiment has two magazine stockers 201, but FIG. 2 illustrates only one magazine stocker 201 for convenience, and other magazine stocker 201 is omitted. A number of magazine stockers 201 provided to disc device 101 is not limited to two, and thus may be one or three or more.

Two magazine stockers 201 are disposed so as to face each other in a width direction of disc device 101 (a Y-axial direction in FIG. 2) on bottom chassis 211. In FIG. 2, magazine stocker 201 on a front side of the drawing is omitted. Further, magazine stocker 201 has a top board and a partition board, but in FIG. 2, they are not shown.

A plurality of magazines 202 is stored in magazine stocker 201 as shown in FIG. 2 as one example. Each magazine 202 has magazine trays 221 where a plurality (for example, 12) of optical discs is housed, respectively. Details of magazine 202 will be described later.

Picker 203 is disposed between two magazine stockers 201. Picker 203 pulls out magazine tray 221 from one magazine 202 selected from a plurality of magazines 202 so as to hold magazine tray 221. Picker 203 carries magazine tray 221, which is being held, to a vicinity of a plurality of disc drives 204 disposed at an end of a depth direction of disc device 101 (in FIG. 2, an end of an X-axial direction, hereinafter, backward). Picker 203 has lifter 205 that pushes out a plurality of the optical discs from magazine trays 221. Lifter 205 is provided integrally to picker 203.

Disc drive 204 is a device that writes or reads data in or from an optical disc. Disc drive 204 is a tray type disc drive that loads an optical disc using a tray. A plurality of disc drives 204 is laminated in a height direction of disc device 101 (a Z-axial direction in FIG. 2), and is disposed so as to be adjacent to two magazine stockers 201 at the backward of disc device 101. Carrier 206 is disposed between a plurality of disc drives 204 laminated to be adjacent to one magazine stocker 201 and a plurality of disc drives 204 laminated to be adjacent to other magazine stocker 201.

Carrier 206 holds a plurality of optical discs pushed out by lifter 205 in a laminated state. Carrier 206, then, takes out one optical disc from a plurality of the held optical discs above a tray (not shown) discharged from any one of a plurality of disc drives 204, and places the taken out optical disc on the tray. In this exemplary embodiment, lifter 205 and carrier 206 compose a disc separation supply device.

Main circuit part 207 having an electric circuit and a power supply is disposed further behind carrier 206 and a plurality of disc drives 204. Controller 110 that controls operations of the devices such as picker 203, disc drive 204, and carrier 206 (for example, motor control) is disposed on main circuit part 207. Controller 110 is connected to system management device 102 (see FIG. 1) that manages disc device 101 via a network.

System management device 102 issues to controller 110 an instruction based on an instruction from a user who operates operation terminal 104 (see FIG. 1), namely, an instruction for specifying magazine 202 and writing or reading data in or from an optical disc housed in specified magazine 202. Controller 110 controls the respective devices such as picker 203, disc drive 204, and carrier 206 according to the instruction from system management device 102.

Magazine stocker 201 is provided along guide rail 212 that guides picker 203 slidably. Guide rail 212 is provided so as to extend to a depth direction of disc device 101 (the X-axial direction), namely, a longitudinal direction of magazine stocker 201. Handle 213 is provided on a forward side surface of magazine stocker 201 (a side surface on a front side of the drawing). For example, the user pulls handle 213 to the front side in the drawing so as to be capable of moving magazine stocker 201 to a forward side of disc device 101. Each of magazine stockers 201 has partition boards (not shown) formed into a lattice shape viewed from the width direction of disc device 101 (the Y-axial direction). Magazine 202 is housed in each region surrounded by the partition boards.

Magazine 202 will be described below.

Figure 3:
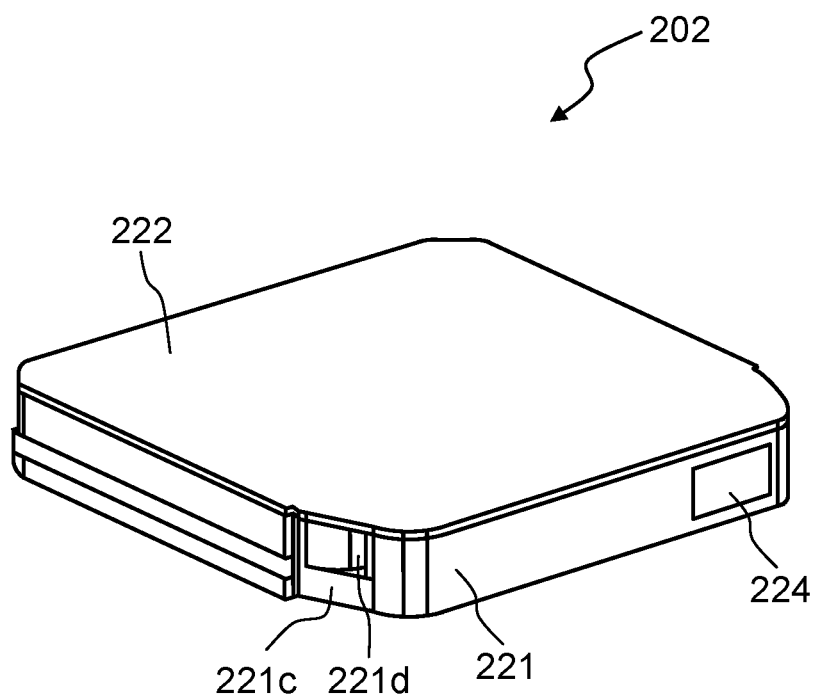
FIG. 3 is a perspective view illustrating one example of an appearance of a magazine according to the first exemplary embodiment.

FIG. 3 is a perspective view illustrating one example of an appearance of magazine 202 according to the first exemplary embodiment.

Figure 4:
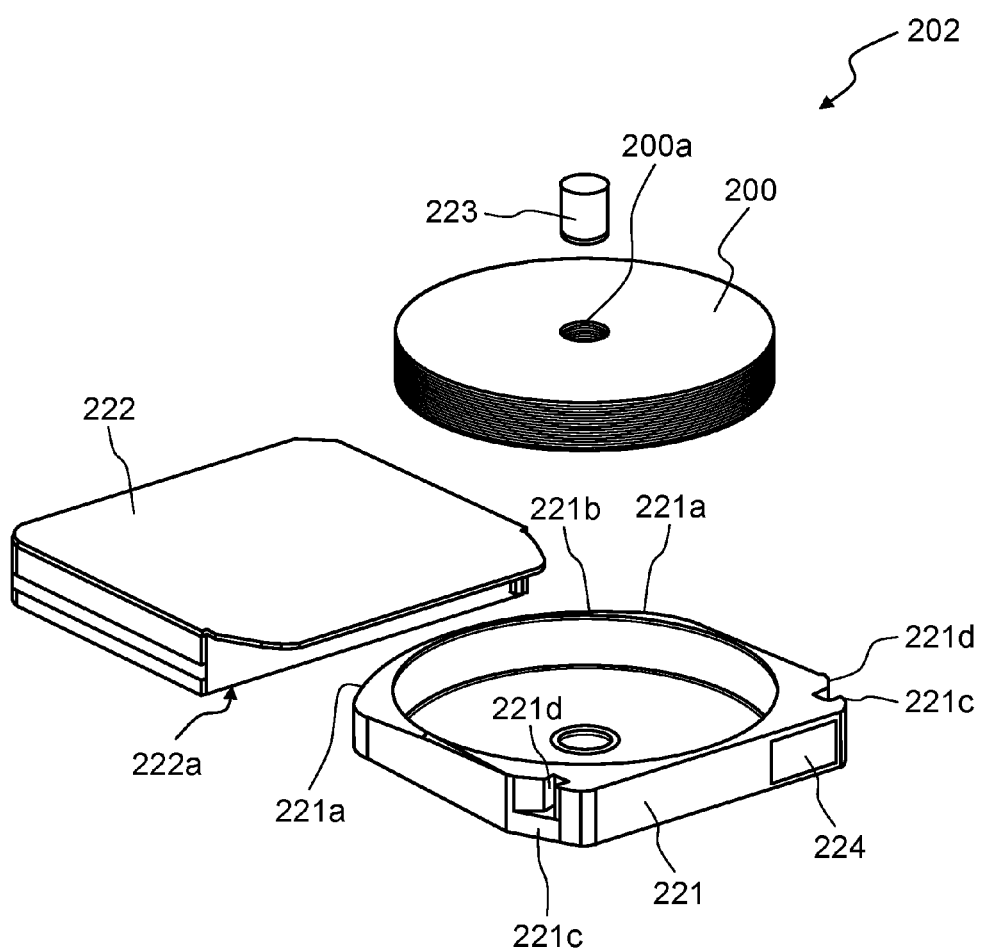
FIG. 4 is an exploded perspective view schematically illustrating one configuration example of the magazine according to the first exemplary embodiment.

FIG. 4 is an exploded perspective view schematically illustrating one configuration example of magazine 202 according to the first exemplary embodiment.

Magazine 202, as shown in FIG. 3, has magazine tray 221, and approximately rectangular parallelepiped case 222 that houses magazine tray 221. As shown in FIG. 4, opening 222a through which magazine tray 221 can be inserted and taken out is provided to one side surface of case 222 (hereinafter, a front surface).

An outer shape of magazine tray 221 has a flat and approximately rectangular parallelepiped shape. Magazine tray 221 houses a plurality of optical discs 200 in a state that the discs are laminated tightly to each other. Magazine tray 221 is formed with cut part 221a on both corners positioned on a rear surface side of case 222 when magazine tray 221 is housed in case 222.

Further, side surface 221b, which is positioned on the rear side of case 222 when magazine tray 221 is housed in case 222, is formed so that its entire shape including cut part 221a has an arc shape on magazine tray 221.

Further, notch 221c is formed on both corners positioned on the front surface side of case 222 when magazine tray 221 is housed in case 222 on magazine tray 221. Engagement recessed part 221d that is engaged with a pair of hooks 235, described later, is formed inside notch 221c.

Core rod 223 that is inserted into center hole 200a provided on each of a plurality of optical discs 200 and restrains a movement of each optical disc 200 to a planar direction is provided to magazine tray 221. Core rod 223 prevents sliding of each optical disc 200 to a planar direction, and thus scratches of optical disc 200 that might be caused by the sliding is prevented.

Description of disc device 101 is continued with return to FIG. 2.

Picker 203 has travel base 231. A carriage (not shown) that moves slidably on guide rail 212 is mounted to one side of travel base 231 on a side of magazine stocker 201.

Further, a roller (not shown) is mounted to the other side of travel base 231 on the side of magazine stocker 201.

Rack 214 is fixed to bottom chassis 211. On the other hand, travel base 231 is not fixed to bottom chassis 211. For this reason, when a pinion gear (not shown), which is meshed with rack 214 and transmits a force from a driving source, rotates, the pinion gear moves along rack 214, and picker 203 moves to the depth direction of disc device 101 (the X-axial direction).

Picker 203 is described here.

Figure 5:
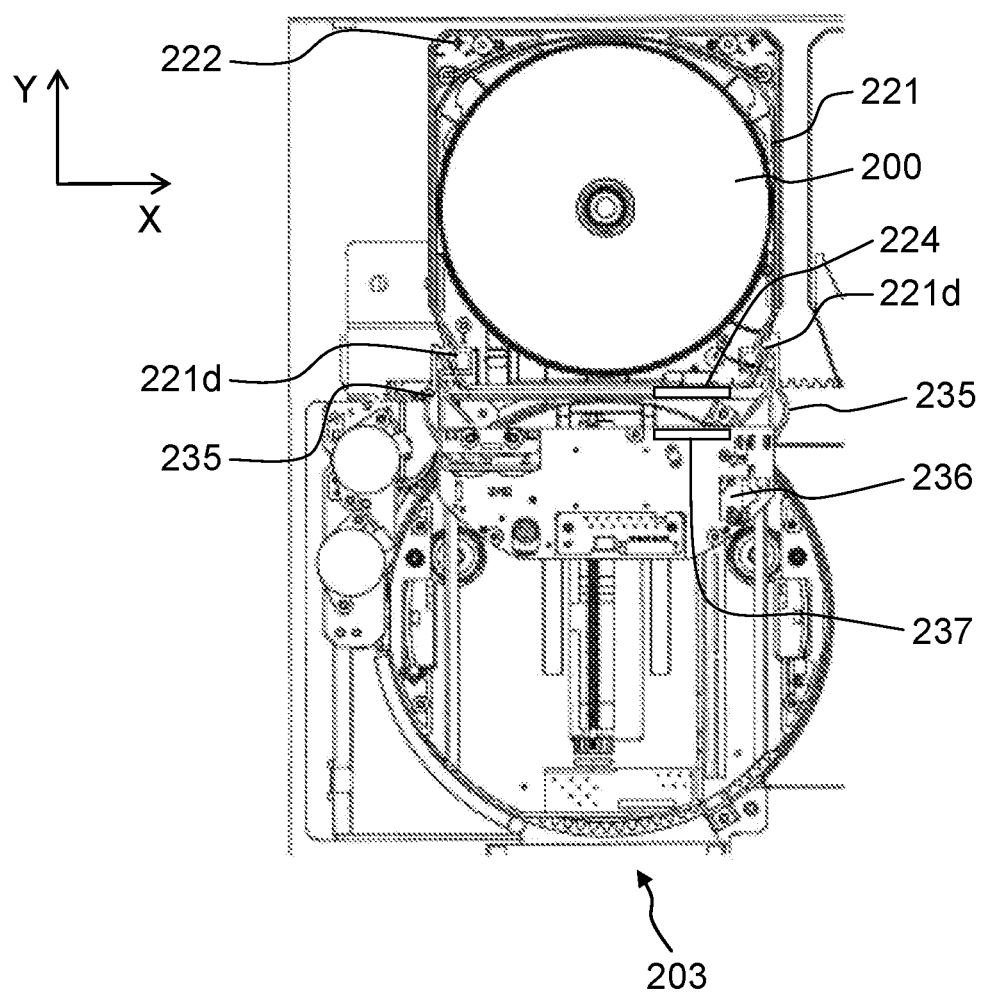
FIG. 5 is a plan view schematically illustrating an operation of a picker for pulling out a magazine tray from the magazine in the disc device according to the first exemplary embodiment.

FIG. 5 is a plan view schematically illustrating an operation of picker 203 for pulling out magazine tray 221 from magazine 202 in disc device 101 according to the first exemplary embodiment. FIG. 5 illustrates a configuration of platform 234 (see FIG. 2), the pair of hooks 235, and chuck 236 provided to picker 203, and illustrate a state that hooks 235 are engaged with engagement recessed part 221d of magazine tray 221.

Platform 234 is a device that moves, as shown in FIG. 2, chuck 236 or the like to a height of magazine tray 221 to be operated.

The pair of hooks 235 performs an opening/closing operation. The pair of hooks 235 is engaged with engagement recessed part 221d of magazine tray 221 by the closing operation, and the engaging is released by the opening operation.

Chuck 236 causes hooks 235 to perform the opening/closing operation, and moves hooks 235 to the Y-axial direction shown in FIG. 5. When chuck 236 is moved with hooks 235 being engaged with engagement recessed part 221d, magazine tray 221 can be taken out of case 222 or can be housed in case 222.

Magazine tray 221 has an information holder that holds identification information for identifying each of magazines 202 or management information for managing each of magazines 202. FIG. 4 illustrates a configuration example where radio identifier 224, in which information can be read and written without a power supply in a contactless manner, is used in the information holder. That is to say, the following description refers to the configuration example where radio identifier 224 is provided to magazine tray 221. Such radio identifier 224 can be realized by, for example, using RFID (Radio Frequency IDentifier). Radio identifier 224 holds various information such as the identification information for identifying magazine 202, a type of optical disc 200, a capacity of optical disc 200, and a number of optical discs 200 housed in magazine 202. Radio identifier 224 holds these pieces of information, and also can perform, for example, additional recording, reading, and updating of the information. The information holder is not limited to radio identifier 224 at all. Any unit may be used as the information holder as long as it can identify each of magazines 202. For example, bar codes stuck to magazine trays 221 may be used as the information holders.

In this exemplary embodiment, as shown in FIGS. 4 and 5, radio identifier 224 is provided to a portion near picker 203 in magazine tray 221. Radio communicator 237 is provided to a portion of picker 203 (chuck 236), the portion being near magazine tray 221. Radio communicator 237 has an antenna for reading information of radio identifier 224 in a contactless manner (or, recording information in radio identifier 224 in a contactless manner) and a radio control circuit. When picker 203 approaches magazine tray 221, radio communicator 237 reads information from radio identifier 224. Further, when magazine tray 221 is housed in case 222, picker 203 records information in radio identifier 224 or updates information recorded in radio identifier 224 using radio communicator 237.

As described above, in this exemplary embodiment, by picker 203 closely approaching magazine tray 221, disc device 101 can read information from radio identifier 224 or can record information in radio identifier 224 in a contactless manner. That is to say, disc device 101 can identify each of magazines 202 without disposing optical disc 200 housed in magazine 202 on disc drive 204 and reading data from optical disc 200. When identifying magazine 202, this can reduce a time required for a process in which disc device 101 takes out magazine tray 221 from case 222, and disposes each of optical discs 200 on disc drive 204.

It is desirable that system management device 102 is notified about what information is recorded in each radio identifier 224 provided to each magazine 202 when disc device 101 writes data in optical disc 200. For example, when disc device 101 notifies system management device 102 of the identification information of magazine 202 recorded in radio identifier 224 and various information relating to the data written in optical disc 200, and registers these pieces of information in system management device 102, disc device 101 can obtain necessary information only through inquiring of system management device 102 about these pieces of registered information when magazine 202 registered in system management device 102 is operated next time. As a result, disc device 101 can shorten the time required for a process for reading various information from radio identifier 224.

Magazine management device 103 will be described below.

Figure 6:
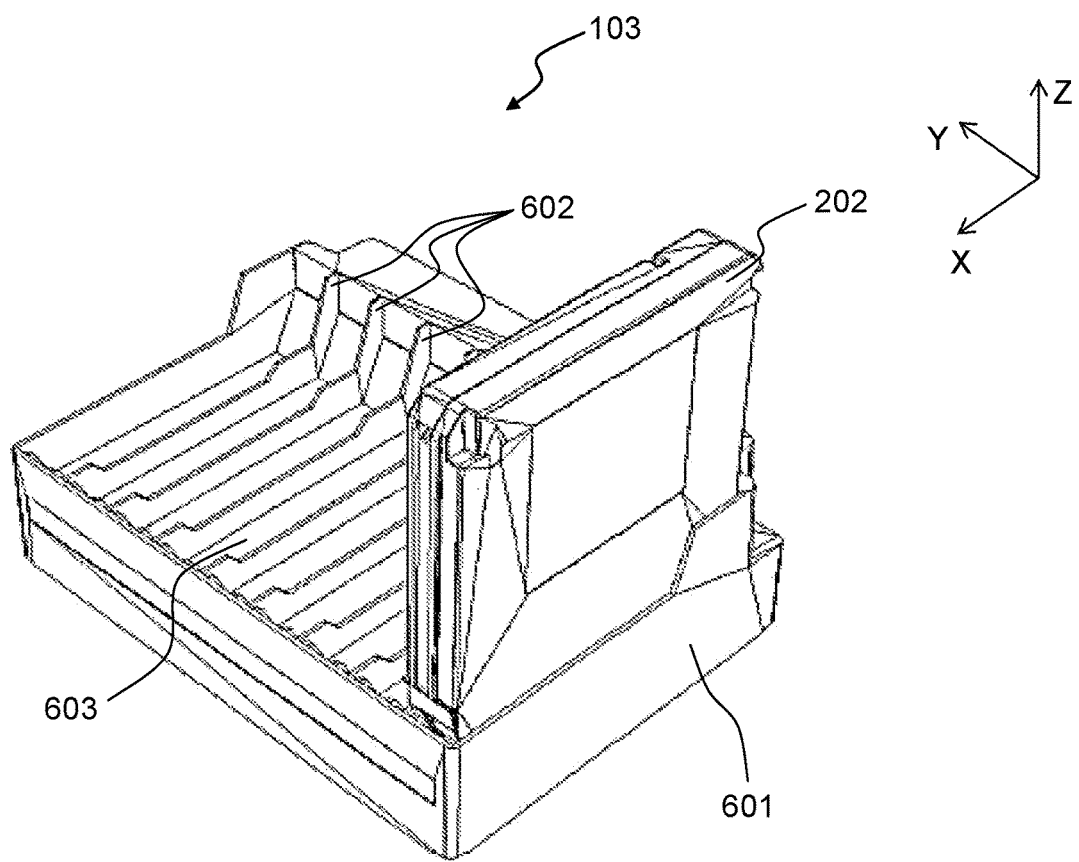
FIG. 6 is a perspective view illustrating one example of an appearance of the magazine management device according to the first exemplary embodiment.

FIG. 6 is a perspective view illustrating one example of an appearance of magazine management device 103 according to the first exemplary embodiment.

Magazine management device 103 stores and manages magazine 202 taken out from disc device 101. Magazine management device 103 includes case 601, partition boards 602, and circuit part 603.

Case 601 stores and holds a plurality of magazines 202. When a plurality of magazines 202 is stored in case 601, partition boards 602 separate magazines 202 from each other so as to decide respective storing positions. Regions divided by partition boards 602 are called slots. One magazine 202 is stored in one slot in magazine management device 103.

Circuit part 603 is a circuit that electrically controls magazine management device 103. Circuit part 603 is disposed on a bottom part of case 601. The bottom part of case 601 is a portion having a surface (a bottom surface) that supports magazines 202 inserted into the slots. A mechanism that supports magazine 202 may be provided to partition board 602. Magazine 202 may be supported to the bottom part of case 601 indirectly by being supported by this mechanism.

Magazine 202 is inserted into each slot of case 601 so that a front surface of magazine tray 221 faces the bottom part of case 601 (hereinafter, faces downward). For this reason, in magazine 202 inserted into case 601, radio identifier 224 provided to magazine tray 221 faces the bottom part of case 601.

Figure 7:
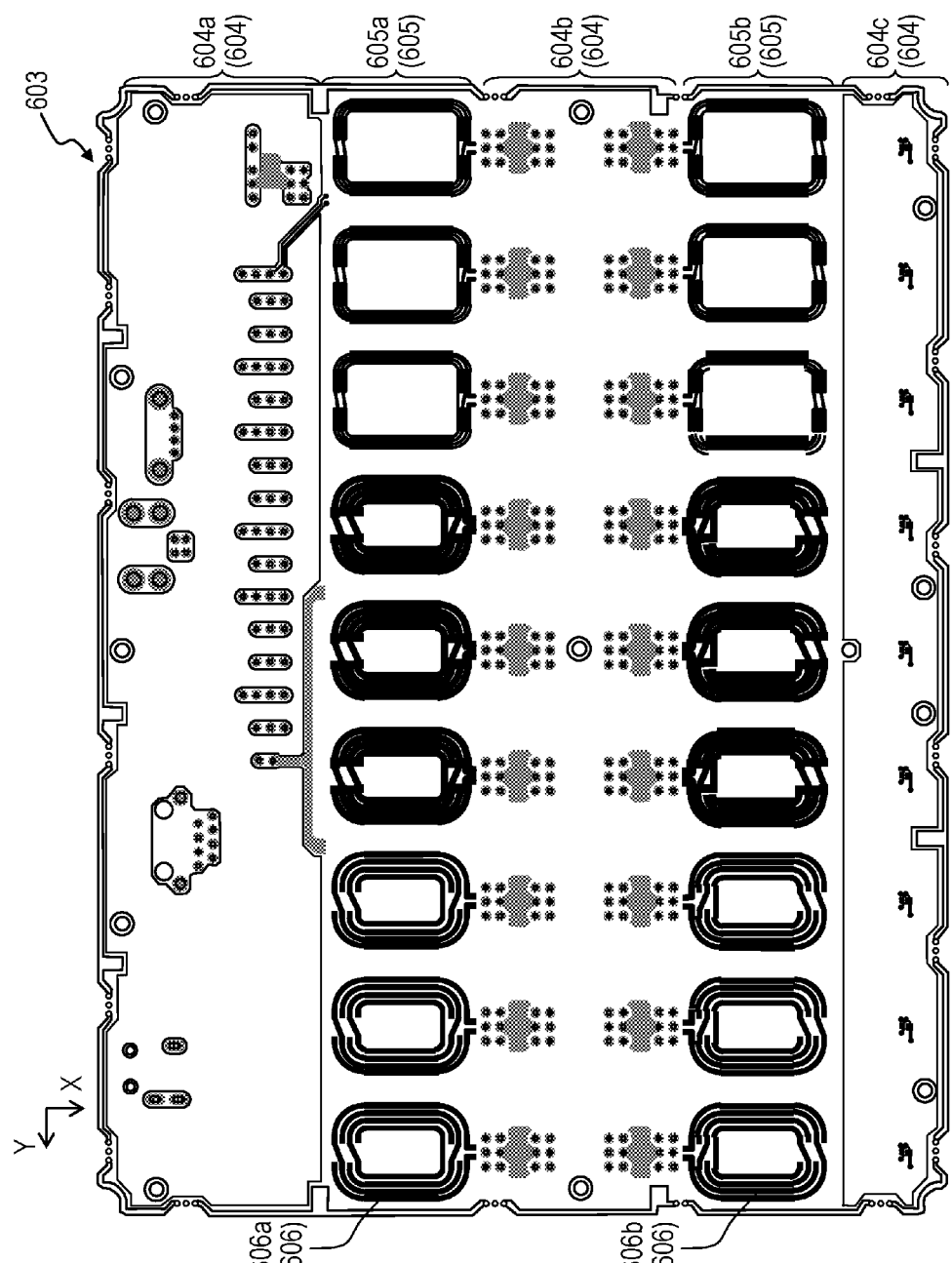
FIG. 7 is a plan view schematically illustrating one example of a circuit part provided to the magazine management device according to the first exemplary embodiment.

FIG. 7 is a plan view schematically illustrating one example of circuit part 603 provided to magazine management device 103 according to the first exemplary embodiment. FIG. 7 illustrates one configuration example of a circuit board realizing circuit part 603.

Circuit part 603 has circuit packaging part 604 and antenna part 605.

Circuit packaging part 604 includes first circuit packaging part 604a, second circuit packaging part 604b, and third circuit packaging part 604c.

For example, CPU (Central Processing Unit), an integrated circuit for RF (Radio Frequency), a communication integrated circuit for magazine management device 103 to communicate with system management device 102, and various connectors are packaged in first circuit packaging part 604a.

A circuit wiring for electrically connecting the integrated circuit for RF and antenna part 605 to each other is packaged in second circuit packaging part 604b.

For example, a circuit pattern as a ground part on the circuit is formed on third circuit packaging part 604c. Further, a lightening element such as LED (Light Emitting Diode) indicating a state or the like of each of magazines 202 may be packaged in third circuit packaging part 604c.

Antenna part 605 includes first antenna region 605a and second antenna region 605b.

A plurality of first antennas 606a is formed on first antenna region 605a, and each of a plurality of first antennas 606a is disposed on positions on the bottom part of case 601 corresponding to the regions (slots) divided by partition boards 602. A plurality of second antennas 606b is formed on second antenna region 605b, and each of a plurality of second antennas 606b is disposed on positions of the bottom part of case 601 corresponding to the regions (the slots) divided by partition boards 602. Each of a plurality of first antennas 606a and each of a plurality of second antennas 606b are disposed on the position so as to face each other via second circuit packaging part 604b. In magazine management device 103, a pair of antennas 606 formed by one first antenna 606a and one second antenna 606b that face each other is formed on the bottom part of case 601 for each slot provided to case 601.

Therefore, in magazine management device 103, a pair of antennas 606 formed in such a manner corresponds to one magazine 202 stored in case 601. In this manner, magazine management device 103 is provided with a plurality of the antennas (for example, first antenna 606a and second antenna 606b) for one magazine 202 stored in case 601. As a result, magazine management device 103 can wirelessly communicate with magazine 202 satisfactorily.

In the example shown in FIG. 3, radio identifier 224 is disposed on an end of magazine tray 221 on the front surface side (in the example shown in FIG. 3, a right end). When magazine 202 is stored in the region (slot) divided by partition boards 602 of case 601 in magazine management device 103, magazine 202 is inserted with the front surface side of magazine tray 221 facing the bottom part of case 601 (namely, facing downward). At this time, however, a right or left direction of the insertion of magazine 202 into the slot is not limited. In magazine management device 103, magazine 202 can be inserted into the slot of case 601 in a state of, for example, a right or left direction opposite to the direction shown in FIG. 6 (a direction where magazine 202 is turned 180° about a Z-axial direction shown in FIG. 6 as a rotational axis). For this reason, a disposed position of radio identifier 224 provided to magazine 202 stored in the slot changes according to the insertion direction of magazine 202 into the slot (a right or left insertion direction). However, in magazine management device 103, since one first antenna 606a and one second antenna 606b form one pair of antennas 606, even when magazine 202 is inserted into the slot of case 601 in any direction, any one of first antenna 606a and second antenna 606b closely approaches radio identifier 224. Therefore, magazine management device 103 can wirelessly communicate with radio identifier 224 of magazine 202 stored in the slot of case 601 through any one of first antenna 606a and second antenna 606b.

In other words, when a user who uses magazine management device 103 according to this exemplary embodiment inserts magazine 202 into the slot of magazine management device 103, the user may insert magazine 202 into the slot in whichever of right and left directions as long as the front surface of magazine tray 221 faces the bottom part of magazine management device 103. For this reason, user's convenience is improved.

FIG. 7 illustrates three kinds of antenna wiring patterns, but this is only an example. The present disclosure does not limit the antenna wiring pattern at all. Any antenna wiring pattern may be used as long as the antenna wiring pattern can wirelessly communicate with radio identifier 224 appropriately.

Figure 8:
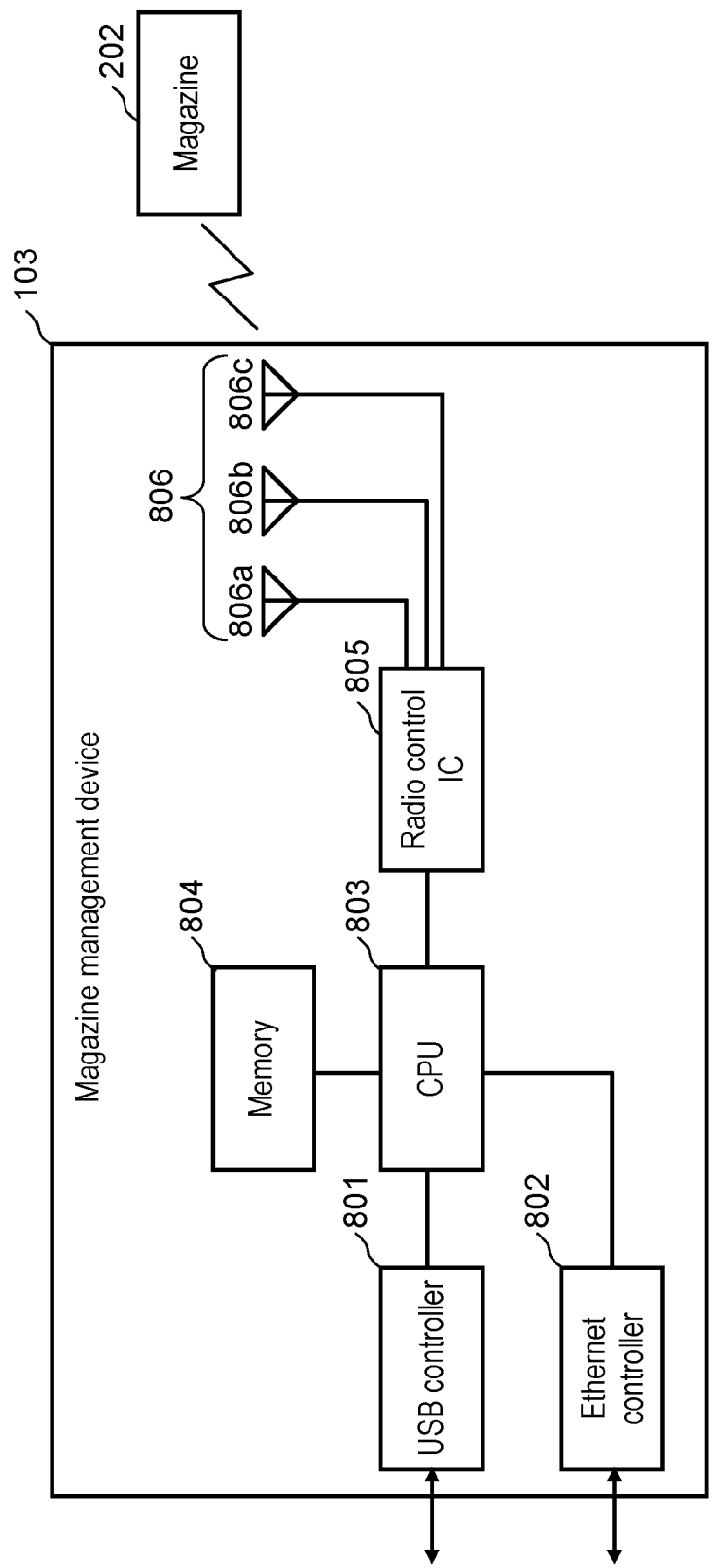
FIG. 8 is a block diagram schematically illustrating one example of a functional configuration of the magazine management device according to the first exemplary embodiment.

FIG. 8 is a block diagram schematically illustrating one example of a functional configuration of magazine management device 103 according to the first exemplary embodiment. FIG. 8 illustrates a function realized by circuit part 603 as a function configuration diagram.

Magazine management device 103 has USB controller 801, Ethernet (registered trademark) controller 802, CPU 803, memory 804, radio control IC 805, and antenna 806. USB controller 801 is one example of a first communication section. Ethernet controller 802 is one example of a second communication section. CPU 803 is one example of an arithmetic processor.

USB controller 801 controls a USB protocol to be used when a plurality of magazine management devices 103 is connected by a daisy chain and USB communication is performed between magazine management devices 103. This exemplary embodiment illustrates the configuration example where the USB protocol is used for the communication between a plurality of magazine management devices 103, but the present disclosure is not limited to this configuration at all.

Ethernet controller 802 controls the communication during the communication between magazine management device 103 and system management device 102 using an Ethernet protocol. This exemplary embodiment illustrates the configuration example where the Ethernet protocol is used for the communication between magazine management device 103 and system management device 102, but the present disclosure is not limited to this configuration at all.

CPU 803 controls USB controller 801, Ethernet controller 802, and the like. Further, CPU 803 controls radio control IC 805 so as to wirelessly communicate with radio identifier 224 provided to magazine 202.

When CPU 803 operates, memory 804 holds data to be temporarily held or various setting information. Memory 804 may be a non-volatile storage medium or a volatile storage medium, or may be a combination of them.

Radio control IC 805 generates a high-frequency signal (an RF signal) according to the control from CPU 803, and outputs the generated high-frequency signal to antenna 806, described later. Further, radio control IC 805 takes out information from the high-frequency signal received through antenna 806 so as to output the information to CPU 803.

Antenna 806 transmits a radio wave based on the high-frequency signal generated by radio control IC 805 to the outside, and receives a radio wave from the outside (for example, a radio wave output from radio identifier 224 of magazine 202) so as to output the obtained high-frequency signal to radio control IC 805.

Magazine management device 103 may be configured so that one radio control IC 805 may control a plurality of antennas 806, or radio control ICs 805 whose number is the same as a plurality of antennas 806 are provided, and a plurality of antennas 806 corresponds to radio control ICs 805 on a one-to-one basis. FIG. 8 illustrates antennas 806a, 806b, 806c as a plurality of antennas 806, but a plurality of antennas 806 corresponds to a plurality of first antennas 606a and a plurality of second antennas 606b. Therefore, antennas 806a, 806b, 806c are described as only an example.

[1-2. Operation]

The operation of magazine management device 103 having the above configuration will be described below.

Figure 9:
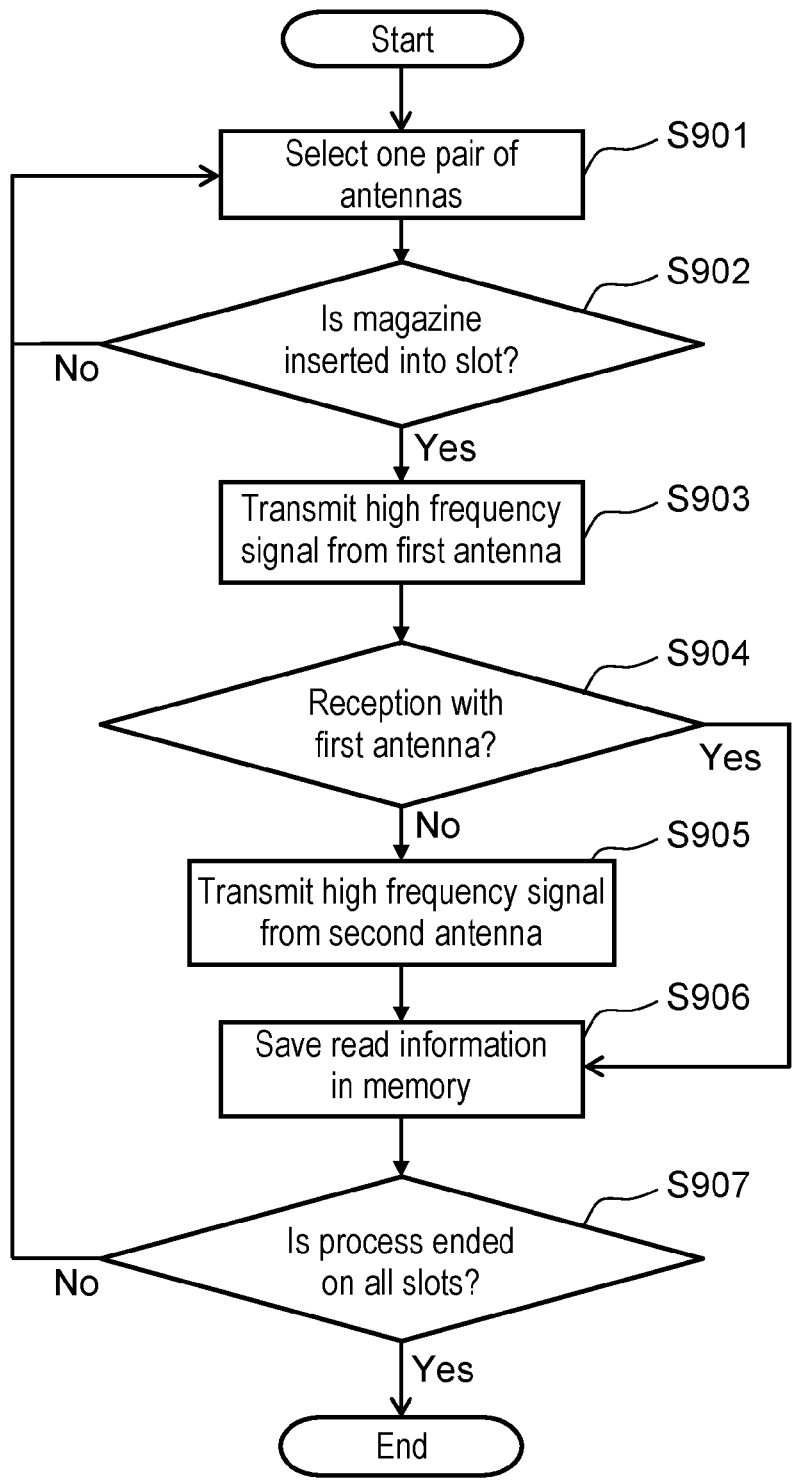
FIG. 9 is a flowchart illustrating one operation example of antenna control of the magazine management device according to the first exemplary embodiment.

FIG. 9 is a flowchart illustrating one operation example of antenna control of magazine management device 103 according to the first exemplary embodiment. FIG. 9 illustrates a flowchart where CPU 803 controls first antennas 606a and second antennas 606b so as to make wireless communication.

CPU 803 selects a pair of antennas 606 to execute a process from plural pairs of antennas 606 (step S901). In this exemplary embodiment, a selecting method is not limited at all. For example, one pair of antennas 606 corresponding to slots may be selected sequentially from a slot at an edge of magazine management device 103. Alternatively, one pair of antennas 606 may be selected on another basis.

CPU 803 determines whether magazine 202 is stored in regions (slots) corresponding to one pair of antennas 606 selected at step S901 (step S902). This determination may be made by CPU 803 based on a detection result of, for example, a sensor that is provided in each slot and detects presence or absence of magazine 202 (for example, a switch, not shown, that is pressed down by magazine 202 inserted into the slot). Alternatively, the configuration may be such that a radio wave for detecting radio identifier 224 is transmitted from antenna 606, and CPU 803 detects presence or absence of magazine 202 depending on existence or non-existence of a response to the radio wave.

When the determination is made at step S902 that magazine 202 is stored in that slot (Yes at step S902), the process goes to step S903. When the determination is made at step S902 that magazine 202 is not stored in that slot (No at step S902), the process returns to step S901, and step S901 is again executed so that another pair of antennas 606 is selected.

CPU 803 controls radio control IC 805 so that a radio wave is transmitted from first antenna 606a provided to the pair of antennas 606 selected at step S901, the radio wave superimposing a signal for reading the information of radio identifier 224 (a signal for asking radio identifier 224 for the response) (step S903). As a result, the radio wave is transmitted from first antennas 606a to radio identifier 224.

CPU 803 checks whether a radio wave of a response to the radio wave transmitted from first antennas 606a at step S803 (a radio wave to be transmitted from radio identifier 224 of magazine 202) can be received (step S904).

When the response to the radio wave transmitted from first antennas 606a can be received at step S904 (Yes at step S904), the process goes to step S906.

When the response to the radio wave transmitted from first antennas 606a cannot be received at step S904 (No at step S904), CPU 803 controls radio control IC 805 so that a radio wave similar to the radio wave transmitted from first antenna 606a at step S903 is transmitted to radio identifier 224 from second antenna 606b provided to one pair of antennas 606 selected at step S901 (step S905).

After the determination as Yes at step S904 or after step S905, radio control IC 805 takes out information regarding magazine 202 from the radio wave received via first antenna 606a or second antenna 606b (namely, a radio wave of the response transmitted from radio identifier 224 of magazine 202 stored in the corresponding slot) so as to output the information to CPU 803. CPU 803 receives the information and saves the information in memory 804 (step S906).

CPU 803 determines whether the above process is completed on all the slots provided to magazine management device 103 (step S907).

When the determination is made at step S907 that the process is completed on all the slots (Yes at step S907), CPU 803 ends the series of the process. When the determination is made at step S907 that a slot which is not subject to the process is present (No at step S907), the process returns to step S901 and the process at step S901 and thereafter is again executed.

The flowchart shown in FIG. 9 illustrates an example of the operation for first performing the wireless communication using first antenna 606a, but the wireless communication using second antenna 606b may be first performed.

In this manner, in magazine management device 103, when the information recorded in radio identifier 224 is read, first antenna 606a is first used. At this time, when the information can be read from radio identifier 224 by using first antenna 606a, second antenna 606b is not used. As a result, magazine management device 103 can shorten a time required for reading the information from radio identifiers 224 of all magazines 202 stored in magazine management device 103. That is to say, in magazine management device 103, the process for reading the information from radio identifier 224 is reduced, so that information can be read from radio identifier 224 at a higher speed.

By executing the above process, magazine management device 103 communicates with radio identifiers 224 of all magazines 202 stored in magazine management device 103, and can read and obtain information recorded in radio identifiers 224. Further, magazine management device 103 can know which slot in magazine management device 103 stores magazine 202 that obtains the information from radio identifier 224.

CPU 803 transmits information of magazine 202 saved in memory 804 (for example, the identification information of magazine 202), identification information of magazine management device 103 itself, and information representing a storing place (slot) of magazine 202 in magazine management device 103 to system management device 102.

As a result, system management device 102 can know which magazine 202 is stored in which slot in which magazine management device 103 based on the information to be transmitted from a single or a plurality of magazine management devices 103.

Therefore, the user operates operation terminal 104 and obtains the information from system management device 102, so as to be capable of selecting desired magazine 202 using UI (User Interface) or the like. System management device 102 suitably selects magazine management device 103 in which magazine 202 selected by the user is stored, and can suitably transmit a control signal to magazine management device 103. At this time, magazine management device 103 that receives the control signal may turn on an indicator provided to slot storing magazine 202 specified by the user (for example, LED provided to third circuit packaging part 604c shown in FIG. 7). As a result, the user can visually and easily recognize that magazine 202 selected by the user is stored in where in which magazine management device 103.

In magazine management device 103, a sensor that detects an insertion direction of magazine 202 may be provided to each slot. Magazine management device 103 may be configured such that, based on a detection result of the sensor, CPU 803 determines from which of first antenna 606a and second antenna 606b a radio wave should be transmitted (a radio wave for asking radio identifier 224 for a response).

[1-3. Effects and the Like]

As described above, in this exemplary embodiment, the magazine management device stores a plurality of magazines in which a plurality of optical discs is housed. The magazine management device includes a case that supports the plurality of magazines, a plurality of partitions that divides the case so as to form a plurality of regions in which the magazines can be stored one by one, an antenna that transmits a radio wave for asking a radio identifier provided to the magazine for a response and receives a radio wave of the response transmitted from the radio identifier, and an arithmetic processor that receives information obtained from the radio wave of the response received by the antenna.

Magazine management device 103 is one example of the magazine management device. Optical disc 200 is one example of the optical disc. Magazine 202 is one example of the magazine. Case 601 is one example of the case. Partition board 602 is one example of the partition. Radio identifier 224 is one example of the radio identifier. Each of antennas 606, 606a, 606b, 806, 806a, 806b, 806c is one example of the antenna. CPU 803 is one example of the arithmetic processor.

As a result, in the configuration example in this exemplary embodiment, magazine management device 103 can wirelessly communicate with radio identifier 224 provided to magazine 202, and can obtain, for example, the identification information of magazine 202 from radio identifier 224.

In this magazine management device, the arithmetic processor may transmit, to a system management device, the information obtained from the radio wave of the response, identification information of the magazine management device, and information representing a storing place of the magazine in the magazine management device.

System management device 102 is one example of the system management device.

As a result, for example, system management device 102 can obtain information regarding magazine 202 stored in magazine management device 103 (for example, identification information of magazine 202) and can manage the information about magazine 202.

In this magazine management device, the antenna may be disposed on each of the regions divided by the partitions.

As a result, for example, system management device 102 can know which magazine 202 is stored in which slot in magazine management device 103.

In this magazine management device, the antenna may be configured to include the first antenna and the second antenna. Further, the antenna may be disposed on a bottom part of the case.

First antenna 606a is one example of the first antenna. Second antenna 606b is one example of the second antenna.

In the configuration example described in this exemplary embodiment, a plurality of optical discs 200 housed in magazine 202 is held by magazine tray 221 provided to magazine 202. Radio identifier 224 is provided to a part of a front surface of magazine tray 221. Further, magazine 202 is inserted into magazine management device 103 with the front surface of magazine tray 221 (namely, a surface provided with a radio identifier) facing the bottom part of magazine management device 103.

Therefore, for example, in magazine management device 103, antenna 606 is provided to the bottom part of case 601, so that magazine management device 103 can read, in a contactless manner, the information recorded in radio identifier 224 provided to magazine 202 in a state where magazine 202 is stored in the slot.

Further, for example, in magazine management device 103, first antenna 606a and second antenna 606b are provided to each slot on the bottom part of magazine management device 103. As a result, even when magazine 202 is inserted into the slot in whichever of right and left directions, radio identifier 224 provided to magazine 202 closely approaches any one of first antenna 606a and second antenna 606b. Therefore, magazine management device 103 can perform the wireless communication with radio identifier 224 satisfactorily. In other words, when a user who uses magazine management device 103 according to exemplary embodiment inserts magazine 202 into the slot of magazine management device 103, the user may insert magazine 202 into the slot in whichever of right and left directions as long as the front surface of magazine tray 221 faces the bottom part of magazine management device 103. For this reason, user's convenience is improved.

In this magazine management device, the arithmetic processor transmits a radio wave for asking the radio identifier for the response from any one of the first antenna and the second antenna, and when the arithmetic processor cannot receive the radio wave of the response, the arithmetic processor may transmit the radio wave for asking the radio identifier for the response from the other antenna.

For example, in magazine management device 103, the wireless communication with radio identifier 224 is performed by using first antenna 606a at first, and when a radio wave of the response is not returned from radio identifier 224, then the wireless communication with radio identifier 224 is performed by using second antenna 606b. As a result, in magazine management device 103, the process for reading information from radio identifier 224 is reduced, so that information can be read from radio identifier 224 at a higher speed.

This magazine management device may have a sensor that detects presence or absence of the magazine in the region divided by the partition. Further, the arithmetic processor may determine an antenna to be used based on a detection result of the sensor.

As a result, for example, in magazine management device 103, an antenna to wirelessly communicate with radio identifier 224 can be decided based on the detection result of the sensor. That is to say, in magazine management device 103, use of antenna 606 disposed in a slot that does not store magazine 202 can be omitted. Therefore, magazine management device 103 can obtain information from radio identifier 224 of each magazine 202 stored in magazine management device 103 at a higher speed.

This magazine management device may have a sensor that detects an insertion direction of the magazine in the region divided by the partition. Further, the arithmetic processor may determine which of the first antenna and the second antenna is used based on a detection result of the sensor.

As a result, for example, in magazine management device 103, any one of first antenna 606a and second antenna 606b can be decided as the antenna to wirelessly communicate with radio identifier 224 based on the detection result of the sensor. That is to say, in magazine management device 103, use of the other antenna of first antenna 606a and second antenna 606b that is not near radio identifier 224 can be omitted. Therefore, magazine management device 103 can obtain information from radio identifier 224 of each magazine 202 stored in magazine management device 103 at a higher speed.

Further, in the exemplary embodiment, the disc device has a radio identifier in which information including identification information of a magazine is recorded, and detachably stores the magazine in which a plurality of optical discs is housed. This disc device includes a picker that takes out the plurality of optical discs from the magazines, and a disc drive that writes or reads data in or from one optical disc of the plurality of optical discs taken out by the picker. When taking out the plurality of optical discs from the magazine, the picker reads the information from the radio identifier provided to the magazine.

Disc device 101 is one example of the disc device. Picker 203 is one example of the picker. Disc drive 204 is one example of the disc drive.

In the configuration example described in this exemplary embodiment, magazine 202, in which a plurality of optical discs 200 is housed, is provided with radio identifier 224. Radio identifier 224 records various information such as the identification information for identifying magazine 202, a type of optical disc 200, a capacity of optical discs 200, and a number of optical discs 200 housed in magazine 202. Disc device 101 takes out optical disc 200 from magazine 202 so as to write and read data. Picker 203 of disc device 101 has radio communicator 237 that communicates with radio identifier 224. When picker 203 closely approaches magazine 202, radio communicator 237 reads information recorded in radio identifier 224, or records new information in radio identifier 224. Disc device 101 compares the information read from radio identifier 224 and information saved in or outside disc device 101, disc device 101 comes to know the information regarding magazine 202 (for example, a type of data written in optical disc 200 in magazine 202, a date and a time when data is written in optical disc 200, a date and a time when the data in optical disc 200 is updated, and an available capacity in magazine 202).

As a result, disc device 101 can know the information regarding optical disc 200, such as a type of data written into optical disc 200 and a capacity of optical disc 200 without directly operating optical disc 200 in magazine 202. Therefore, when disc device 101 obtains the information regarding optical disc 200 housed in magazine 202, the operation for taking out optical disc 200 from magazine 202 and carrying optical disc 200 to disc drive 204 is not necessary. As a result, a time required for doing such operations can be reduced.

Second Exemplary Embodiment

The first exemplary embodiment has described the configuration example where antennas 606 are disposed on the bottom part of case 601 in magazine management device 103. In the present disclosure, however, a disposing position of the antennas in a magazine management device is not limited to the bottom part of the case at all. The second exemplary embodiment will describe a configuration example where the antennas provided to a magazine management device are disposed on an antenna base provided to a bottom part of a case in a substantially vertical direction.

The second exemplary embodiment will be described below with reference to FIGS. 10 and 11.

Features of the second exemplary embodiment different from those of the first exemplary embodiment will be mainly described below.

Components that perform the substantially same operations in the first exemplary embodiment are denoted by same symbols, and description thereof is omitted.

[2-1. Configuration]

Figure 10:
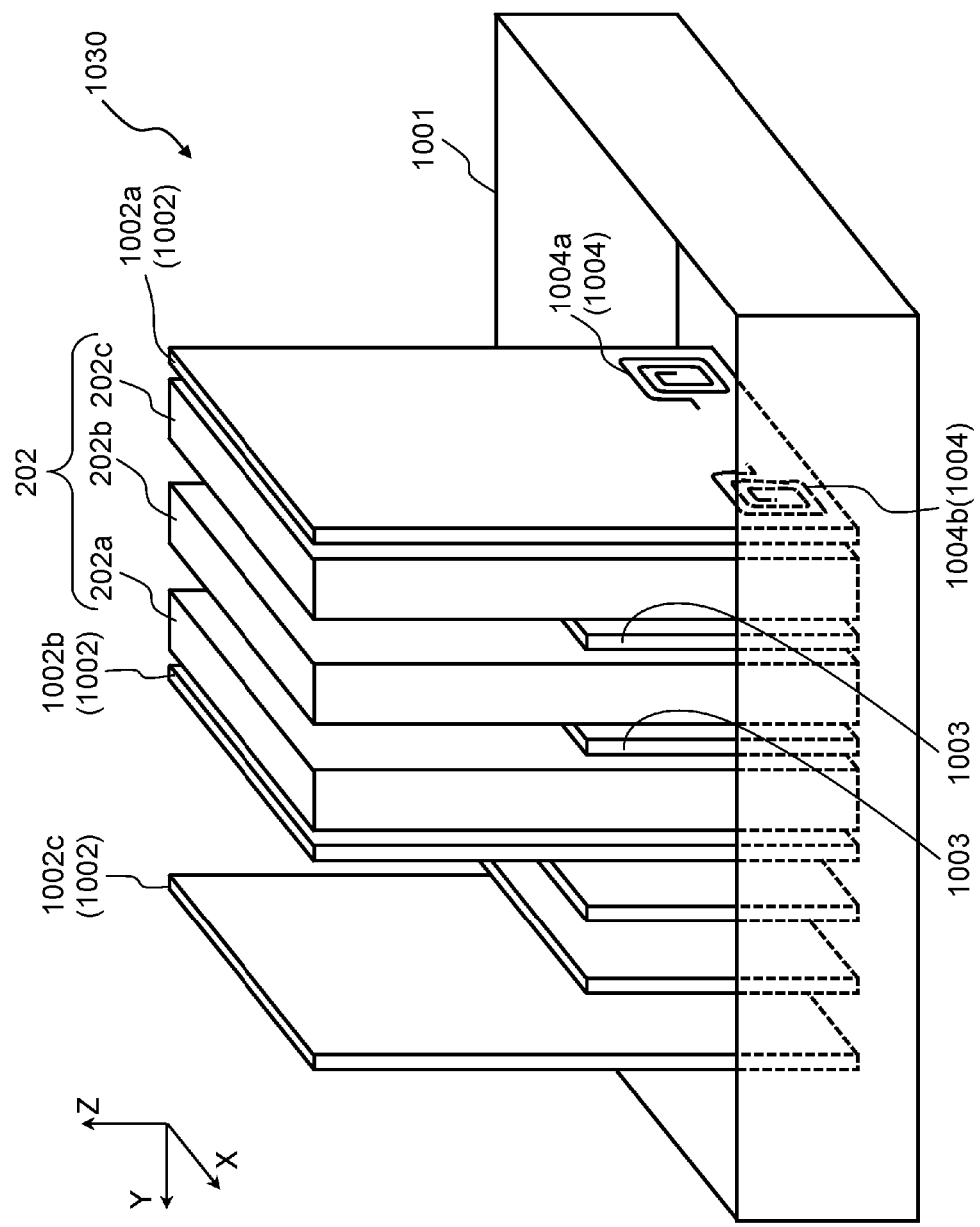
FIG. 10 is a perspective view illustrating one example of an appearance of the magazine management device according to a second exemplary embodiment.

FIG. 10 is a perspective view illustrating one example of an appearance of magazine management device 1030 according to the second exemplary embodiment.

Magazine management device 1030 in this exemplary embodiment includes a case 1001, antenna bases 1002, and partition boards 1003.

Case 1001 stores and holds a plurality of magazines 202.

Partition boards 1003 divide case 1001 so that when a plurality of the magazines 202 is stored in case 1001, respective magazines 202 are separated from each other. Regions divided by partition boards 1003 are slots. Partition boards 1003 have a shape different from the shape of partition boards 602 illustrated in the first exemplary embodiment, but both of them are substantially the same as each other.

Antenna bases 1002 are provided so as to be substantially perpendicular to the bottom part of case 1001, and are provided with antennas 1004 for radio communicating with radio identifier 224 of magazine 202 (transmission and reception of a radio wave). As illustrated in FIG. 10, antenna base 1002 may be used as partition board 1003. That is to say, some of a plurality of partition boards 1003 are substituted by antenna bases 1002, and the adjacent slots may be divided by antenna bases 1002.

Magazine 202 is inserted into the slot of case 1001 with front surface of magazine tray 221 facing the bottom part of case 1001 (namely, facing downward). For this reason, in each magazine 202 stored in case 1001, radio identifier 224 provided to magazine tray 221 is positioned on the bottom part of case 1001 (a lower side). Therefore, in magazine management device 1030, antennas 1004 are provided to each of antenna bases 1002 on a side of the bottom part of case 1001 (lower part of antenna base 1002). Antennas 1004 are used for wireless communication with radio identifier 224 provided to magazine tray 221 similarly to antennas 606 described in the first exemplary embodiment.

FIG. 10 illustrates a configuration example where one antenna base 1002 has a pair of antennas 1004. In the example shown in FIG. 10, antenna base 1002a has antenna 1004a and antenna 1004b. However, magazine management device 1030 in this exemplary embodiment does not limit a number of antennas 1004 provided to antenna base 1002. The number of antennas 1004 provided to antenna base 1002 may be one.

Magazine management device 1030 in this exemplary embodiment has a plurality of antennas bases 1002. FIG. 10 illustrates a configuration example where magazine management device 1030 has three antenna bases 1002 (antenna base 1002a, antenna base 1002b, and antenna base 1002c). Hereafter, antenna bases 1002 are general names of antenna base 1002a, antenna base 1002b, and antenna base 1002c. The number of antenna bases 1002 provided to magazine management device 1030 in this exemplary embodiment is not limited to three, and thus may be two or less, or four or more.

Further, in this exemplary embodiment, as shown as one example in FIG. 10, one antenna base 1002 is provided for a plurality of magazines 202. In the example shown in FIG. 10, one antenna base 1002 is provided for three magazines 202 (namely, one antenna base 1002 for each three slots). As a result, in magazine management device 1030, the number of antennas 1004 can be reduced in comparison with magazine management device 103 described in the first exemplary embodiment.

This exemplary embodiment is not limited to this configuration at all. One antenna base 1002 may be provided for two magazines 202, or one antenna base 1002 may be provided for four or more magazines 202. Alternatively, one antenna base 1002 may be provided for one magazine 202 similarly to the first embodiment. Also in this case, since magazine 202 is disposed on both sides of antenna base 1002, one antenna base 1002 can wirelessly communicate with radio identifiers 224 of at least two magazines 202.

[2-2. Operation]

Since a functional configuration of magazine management device 1030 in this exemplary embodiment is substantially the same as the functional configuration of magazine management device 103 according to the first exemplary embodiment shown in FIG. 8, illustration is omitted. An operation of magazine management device 1030 in this exemplary embodiment will be described below with reference to FIG. 8, FIG. 10, and FIG. 11.

In the following description, as shown in FIG. 10, it is assumed that magazine 202 is stored in each of the three slots between antenna base 1002a and antenna base 1002b. Hereinafter, it is assumed that magazine 202 stored in the slot adjacent to antenna base 1002a is magazine 202c, magazine 202 stored in the slot adjacent to antenna base 1002b is magazine 202a, and magazine 202 stored in the slot between magazine 202a and magazine 202c is magazine 202b.

Figure 11:
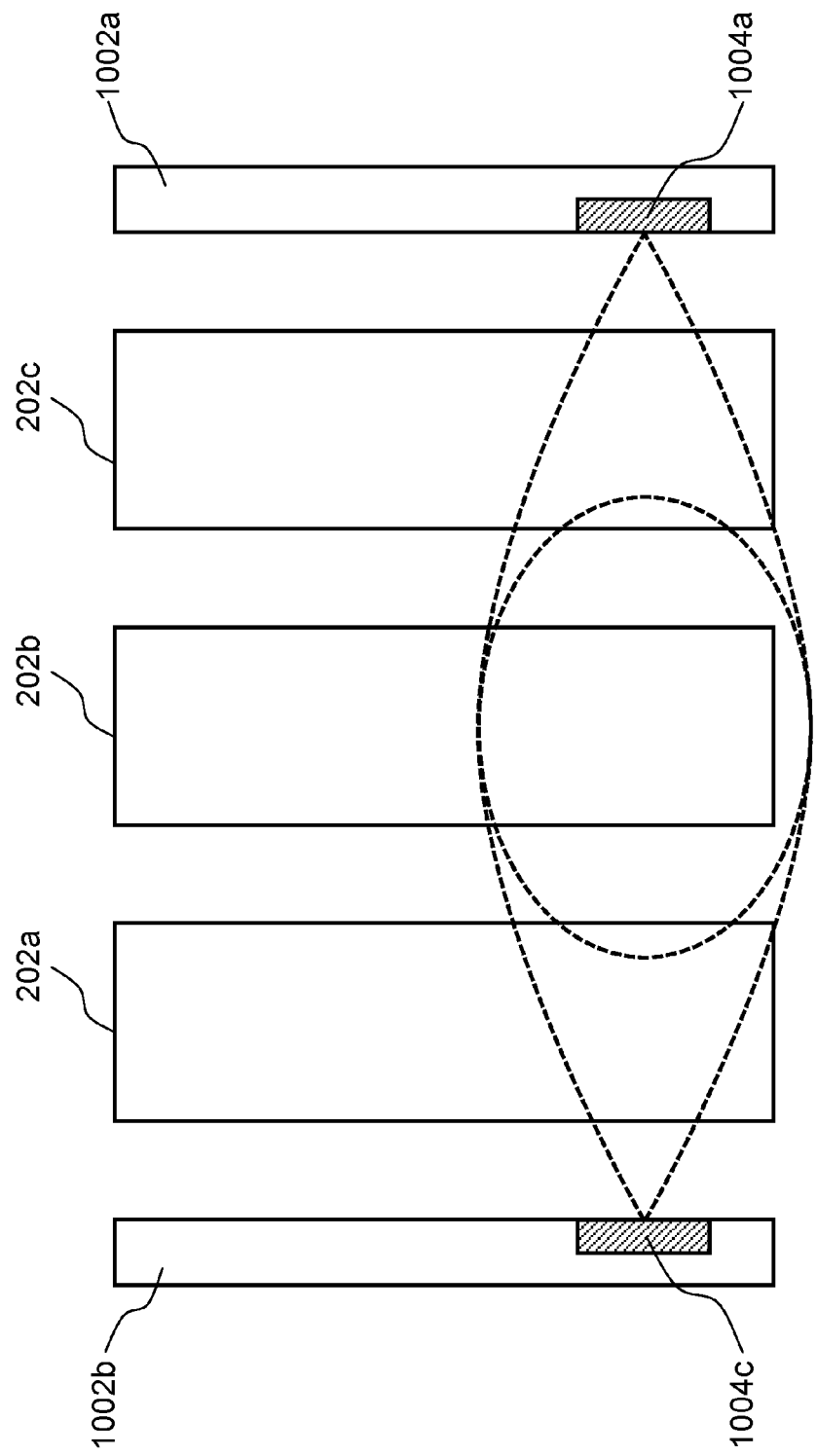
FIG. 11 is a diagram schematically illustrating one example of an operation state of the magazine management device according to the second exemplary embodiment.

FIG. 11 is a diagram schematically illustrating one example of an operation state of magazine management device 1030 according to the second exemplary embodiment. FIG. 11 illustrates a configuration example where antenna 1004a is provided to antenna base 1002a, and antenna 1004c is provided to antenna base 1002b.

CPU 803 drives antennas 1004 on antenna bases 1002 via radio control IC 805, and reads information from radio identifiers 224 of magazines 202. At this time, a radio wave output from antenna 1004 reaches not only radio identifier 224 of magazine 202 that is the closest to antenna 1004 but also radio identifier 224 of another adjacent magazine (see FIG. 11). Each of radio identifiers 224 of a plurality of the magazines that receives radio wave(s) from antenna(s) 1004 transmits radio wave of response independently. Antennas 1004 of magazine management device 103 receive radio waves from a plurality of radio identifiers 224. CPU 803 obtains the information transmitted from a plurality of magazines 202 in such a manner.

In the example shown in FIG. 11, antenna 1004a receives radio wave of response from each of radio identifiers 224 of magazines 202a, 202b, 202c.

In such a manner, CPU 803 communicates with a plurality of radio identifiers 224 using one antenna. When CPU 803 receives a radio wave of a response from each radio identifier 224, CPU 803 obtains a parameter or the like representing a strength of a received radio wave (a strength of a radio wave, a level of an electric power) and a reception state that changes according to a distance between antenna 1004 and radio identifier 224. For example, radio identifier 224 that returns a radio wave of a response, when a comparatively weak radio wave is transmitted from antenna 1004, is relatively close to antenna 1004. Radio identifier 224 that returns a radio wave of a response, only when a comparatively strong radio wave is transmitted from antenna 1004, is relatively far from antenna 1004. Accordingly, the strength of a radio wave to be transmitted from antenna 1004 may be used as the parameter. Further, another antenna 1004 also receives a radio wave of a response from radio identifier 224, and obtains similar information (a parameter or the like representing a strength of a received radio wave and a reception state). CPU 803 calculates each of distances between radio identifiers 224 and antennas 1004 based on the parameters or the like representing the strengths of the reception radio waves and reception states obtained by a plurality of antennas 1004. CPU 803 estimates each of radio identifiers 224 (each of magazines 202 having each of these radio identifier 224) is stored in which slot, based on the calculated distances and positions of each antenna 1004 and information at a time of the reception (the parameters or the like representing the strengths of the received radio waves and the reception states).

CPU 803 can determine each of magazines 202 is stored in which slot, in such a manner. CPU 803 transmits information, such as identification information obtained from radio identifiers 224 and information on places (the slots) where magazines 202 having these radio identifiers 224 are stored, to system management device 102 via Ethernet controller 802.

As a result, similarly to the first exemplary embodiment, system management device 102 can know which magazine 202 is stored in which slot in which magazine management device 103. The user, therefore, operates operation terminal 104 so as to obtain the information from system management device 102, and can check a place where a desired magazine is stored in.

As shown in FIG. 10, when one antenna base 1002 has a pair of antennas 1004 (for example, first antenna 1004a and second antenna 1004b shown in FIG. 10) corresponding to first antenna 606a and second antenna 606b described in the first exemplary embodiment, antennas 1004 can satisfactorily perform wireless communication with radio identifiers 224 even if each magazine 202 is inserted into each slot of magazine management device 1030 in any direction (the right or left direction described in the first exemplary embodiment).

Further, when antenna base 1002 has first antenna 1004a and second antenna 1004b, magazine management device 1030 may execute a process similar to the flowchart described with reference to FIG. 9 in the first exemplary embodiment, so as to be capable of wireless communication with radio identifier 224 more efficiently.

[2-3. Effects and the Like]

As described above, in this exemplary embodiment, the magazine management device stores a plurality of magazines in which a plurality of optical discs is housed. The magazine management device includes a case that supports the plurality of magazines, a plurality of partitions that divides the case so as to form a plurality of regions in which the magazines can be stored one by one, an antenna that transmits a radio wave for asking a radio identifier provided to the magazine for a response and receives a radio wave of the response transmitted from the radio identifier, and an arithmetic processor that receives information obtained from the radio wave of the response received by the antenna. Further, this magazine management device has an antenna base having the antenna, and some of the plurality of partitions are substituted by the antenna bases.

Magazine management device 1030 is one example of the magazine management device. Optical disc 200 is one example of the optical disc. Each of magazines 202, 202a, 202b, 202c is one example of the magazine. Case 1001 is one example of the case. Partition board 1003 is one example of the partition. Radio identifier 224 is one example of the radio identifier. Each of antennas 1004, 1004a, 1004b, 1004c is one example of the antenna. CPU 803 is one example of the arithmetic processor. Each of antenna bases 1002, 1002a, 1002b, 1002c is one example of the antenna base.

As a result, the magazine management device described in this exemplary embodiment can efficiently manage a plurality of magazines similarly to the magazine management device described in the first exemplary embodiment.

In this magazine management device, the antennas may be configured to include the first antenna and the second antenna.

First antenna 1004a is one example of the first antenna. Second antenna 1004b is one example of the second antenna.

As a result, for example, in magazine management device 1030, even when magazine 202 is inserted into the slot in whichever of right and left directions, radio identifier 224 provided to magazine 202 closely approaches any one of first antenna 1004a and second antenna 1004b so that the antenna can wirelessly communicate with radio identifier 224 satisfactorily. In other words, when a user who uses magazine management device 1030 according to this exemplary embodiment inserts magazine 202 into the slot of magazine management device 1030, the user may insert magazine 202 into the slot in whichever of right and left directions as long as the front surface of magazine tray 221 faces the bottom part of magazine management device 103. For this reason, user's convenience is improved.

In the magazine management device, one antenna base is provided for a plurality of the regions divided by the partitions, and the antenna of the antenna base may wirelessly communicate with a plurality of the radio identifiers.

As a result, in magazine management device 1030, for example, the number of the antennas can be reduced in comparison with magazine management device 103 described in the first exemplary embodiment.

Other Exemplary Embodiments

As described above, the first and second exemplary embodiments have been described above as examples of the technique disclosed in this application. However, the technique in the present disclosure is not limited to this, and can be applied also to exemplary embodiments where a modification, a replacement, an addition, an omission, and the like are performed. Further, the respective components described in the first and second exemplary embodiments may be combined so that a new exemplary embodiment can be provided.

Further, the exemplary embodiments have been described as the examples of the technique in the present disclosure. For the description, the accompanying drawings and the detailed description have been provided.

Accordingly, the components illustrated in the accompanying drawings and described in the detailed description may include not only components necessary for solving the technical problems, but also components that are not necessary for solving the technical problems but are merely provided for illustrating the above-described technique. Therefore, the unnecessary components illustrated in the accompanying drawings or described in the detailed description should not be immediately acknowledged to be necessary components.

Further, the above exemplary embodiments are intended to illustrate the technique of the present disclosure, and thus various changes, replacements, additions, omissions or the like can be made within the scope of the claims or in a scope equivalent thereto.

The present disclosure provides the magazine management device that can efficiently manage each magazine housing a plurality of optical discs, and the disc device.

The magazine management device of the present disclosure is effective for efficiently managing each magazine that houses a plurality of optical discs.

The present disclosure can be applied to the disc device that manages optical discs in each magazine, and the magazine management device that manages magazines. Concretely, the present disclosure can be applied to a data server or the like.

What is claimed is:

1. A magazine management device that stores a plurality of magazines where a plurality of optical discs is housed, the magazine management device comprising:
    a case that supports the plurality of magazines;
    a plurality of partitions that divides the case so as to form a plurality of regions in which the plurality of magazines can be stored one by one;
    a radio identifier provided to a magazine from the plurality of magazines;
    at least one antenna operably connected to the case that transmits a first radio wave to the radio identifier and receives a second radio wave carrying a response transmitted from the radio identifier; and
    an arithmetic processor operably connected to the at least one antenna and that receives information obtained from the response carried by the radio wave received by the at least one antenna,
    wherein
    the at least one antenna includes a first antenna and a second antenna disposed on each region from the plurality of regions such that each region includes at least two antennas, and
    the first antenna attempts to transmit the first radio wave to the radio identifier and, when the first antenna does not receive the second radio wave, the second antenna transmits the first radio wave to the radio identifier.

2. The magazine management device according to claim 1, wherein the at least one antenna is disposed on a bottom part of the case.

3. The magazine management device according to claim 1, further comprising a sensor in each region from the plurality of regions, the sensor detects presence or absence of the magazine,
    wherein the arithmetic processor determines which of the first antenna and the second antenna transmits the first radio wave, based on a detection result of the sensor.

* * * * *